(12) United States Patent
García Mijares et al.

(10) Patent No.: US 12,508,087 B2
(45) Date of Patent: Dec. 30, 2025

(54) SPLINT DEVICE FOR GUIDED SURGICAL ROBOT

(71) Applicant: NEOCIS INC., Miami, FL (US)

(72) Inventors: Daniel Jose García Mijares, Miami, FL (US); Mauro Fittipaldi, Miami, FL (US); Alexander Maxfield Parker, Miami, FL (US); Dennis Moses, Hollywood, FL (US)

(73) Assignee: NEOCIS INC., Miami, FL (US)

( * ) Notice: Subject to any disclaimer, the term of this patent is extended or adjusted under 35 U.S.C. 154(b) by 627 days.

(21) Appl. No.: 17/916,438

(22) PCT Filed: Mar. 31, 2021

(86) PCT No.: PCT/IB2021/052714
§ 371 (c)(1),
(2) Date: Sep. 30, 2022

(87) PCT Pub. No.: WO2021/205291
PCT Pub. Date: Oct. 14, 2021

(65) Prior Publication Data
US 2023/0172673 A1    Jun. 8, 2023

Related U.S. Application Data (60) Provisional application No. 63/006,578, filed on Apr. 7, 2020.

(51) Int. Cl.
*A61B 34/30* (2016.01)
*A61B 34/20* (2016.01)
(Continued)

(52) U.S. Cl.
CPC .............. *A61B 34/30* (2016.02); *A61B 34/20* (2016.02); *A61C 1/084* (2013.01); *A61B 2034/2046* (2016.02); *A61B 2090/363* (2016.02)

(58) Field of Classification Search
CPC ......... A61C 1/084; A61B 34/20; A61B 34/30; A61B 2034/2046; A61B 2090/363
See application file for complete search history.

(56) References Cited

U.S. PATENT DOCUMENTS

2006/0281991 A1    12/2006    Fitzpatrick et al.
2010/0203479 A1*    8/2010    Bulloch ............... A61C 8/0089
                                                                    433/215
(Continued)

FOREIGN PATENT DOCUMENTS

CN    105342708 A    2/2016
EP    3 091 933    11/2016
(Continued)

*Primary Examiner* — Chao Sheng
(74) *Attorney, Agent, or Firm* — Womble Bond Dickinson (US) LLP (57) ABSTRACT

A splint device (100) for robotically-guided surgery includes elongate first and second splint portions (200, 400) each having opposed longitudinal ends and an interface edge extending between the ends, wherein the respective interface edges (250, 450) are arranged as a complement to each other. First and second alignment elements (800A, 800B) engaged with the first and second splint portions are arranged to interact with each other such that a substantially consistent gap is defined between the first and second interface edges, from the first ends to the second ends of the first and second splint portions. A threaded member (900) is engaged between the first and second splint portions and arranged to advance the first and second interface edges toward each other in response to advancement of the threaded member. A tracking portion (1000) having a kinematic mount (1100) engaged therewith is engaged with the first or second splint portion and extends outwardly therefrom. An associated method is also provided.

25 Claims, 8 Drawing Sheets

(51) Int. Cl.
*A61B 90/00* (2016.01)
*A61C 1/08* (2006.01)

(56) References Cited

U.S. PATENT DOCUMENTS

| | | |
|---|---|---|
| 2013/0071811 A1 | 3/2013 | Groscurth et al. |
| 2013/0310937 A1* | 11/2013 | Pimenta ................ A61F 2/4425 |
| | | 623/17.15 |
| 2016/0310233 A1* | 10/2016 | Grande .................. A61C 1/084 |
| 2017/0348055 A1* | 12/2017 | Salcedo ................ A61C 9/0006 |
| 2018/0055579 A1 | 3/2018 | Daon et al. |
| 2020/0015934 A1 | 1/2020 | Llop et al. |

FOREIGN PATENT DOCUMENTS

| | | |
|---|---|---|
| JP | 2017-023339 | 2/2017 |
| WO | WO 02/096261 | 12/2002 |
| WO | WO 2004/100767 | 11/2004 |
| WO | 2016096984 A1 | 6/2016 |

* cited by examiner

SPLINT DEVICE FOR GUIDED SURGICAL ROBOT

CROSS-REFERENCE TO RELATED APPLICATIONS

This application is a national stage filing under 35 U.S.C. 371 of PCT/IB2021/052714, filed Mar. 31, 2021, which International Application was published by the International Bureau in English on Oct. 14, 2021, as WO 2021/205291, and application claims priority from U.S. Provisional Application No. 63/006,578, filed on Apr. 7, 2020, which applications are hereby incorporated in their entirety by reference in this application.

BACKGROUND

Field of the Disclosure

The present application relates to surgical robots and associated guidance systems and, more particularly, to a splint device for forming a fiducial marker and/or a tracking marker for the guidance system of a surgical robot.

Description of Related Art

Robotic systems are being increasingly implemented in surgical applications. One such example involves a surgical robot used in dental surgery. Such robots are often associated with a guidance system used to guide the surgical instrument implemented by the surgical robot. The guidance system may also be configured to be involved in the surgical pre-planning process, whether by being involved in gathering and/or analyzing patient data, and planning the surgical procedure, or by relying upon pre-planning data to guide the surgical instrument to conduct the surgical procedure.

In particular, surgical procedures, some surgical robotic systems rely upon a fixed reference point associated with the patient's body for guiding the surgical robot. That is, some such surgical robotic systems define a frame of reference with respect to the patient's body so as to account or otherwise compensate for movements or motion of the patient during the procedure, whether during pre-planning or during the actual surgical procedure itself. This reference point must also be repeatable such that multiple engagements/disengagements (i.e., periods between pre-planning and the actual surgical procedure) do not change the frame of reference implemented by the surgical robot or the guidance system associated therewith.

In particular instances, the reference point (or the connection between the guidance system and the patient to define that reference point) implemented by the guidance system for the surgical robot may be accomplished through, for example, an optical modality, a mechanical modality, an acoustic modality, or other suitable and appropriate tracking/guiding modality, or combination thereof. In some modalities, particularly used in dental surgery applications, one mechanical modality for forming the reference point (i.e., a "fiducial marker") may be accomplished, for example, by attaching/securing a rigid element to the head/teeth of the patient. Such a rigid element, in some instances, may be referred to as and may comprise a splint (see, e.g., prior art in FIGS. 1, 2A, and 2B). Such a splint may generally include, for instance, a retainer portion that grips one or more of the teeth (i.e., by way of an adhesive substance, such as an acrylic material applied between the retainer portion and the teeth), a mounting portion (i.e., mounting arm) that connects the retainer portion to a separate kinematic mount, and the kinematic mount, itself, which may comprise an attachment point for a tracking portion associated with the guidance system for the surgical robot (i.e., wherein, for instance, reflective markers may be mounted to the attachment point for optical tracking of the fiducial marker, or the attachment point may include a securing site for forming a mechanical connection therewith for mechanical tracking of the fiducial marker, or the attachment point may otherwise be configured to receive an appropriate element associated with any other suitable tracking arrangement for the fiducial marker).

In such instances, it may be preferable for the retainer portion to be as rigid as possible (i.e., the structure of the retainer itself, as well as the fixation thereof to the teeth of the patient) throughout the surgical procedure. However, it may also be preferable for the retainer portion to be readily removable when the surgical procedure is complete. In some instances, it may be preferable for the splint to be reproducibly removed and replaced, for example, between the pre-planning procedure (i.e., a CT scan) which may occur on one day (when the splint must be in place so the fiducial marker(s) associated therewith are captured in the scan), and the surgical procedure may occur on another day (wherein the surgical procedure requires the splint to be in place for tracking/guiding the surgical procedure). In other instances, it may be preferable that a single splint configuration be usable or adaptable across a wide population of patients, for example, as a universal fit device. Further, it may be desirable to have a minimum of separate components of the splint, or if separate components are included, that such separate components are integrated into or are firmly and securely affixed as part of the overall splint assembly.

Figure 1:
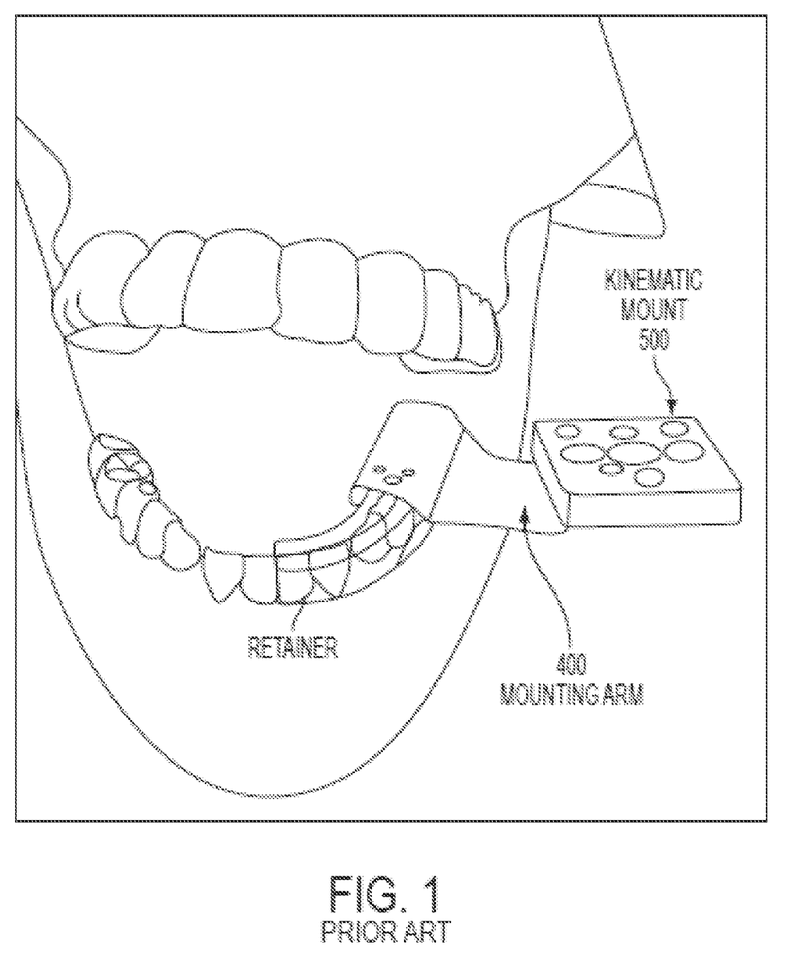
FIG. 1 schematically illustrates a prior art splint device engaged with a representative model of a mouth of a patient so as to provide a fiducial marker and/or a tracking marker for a guidance system for a surgical robot for dental surgeries.
Figure 2A:
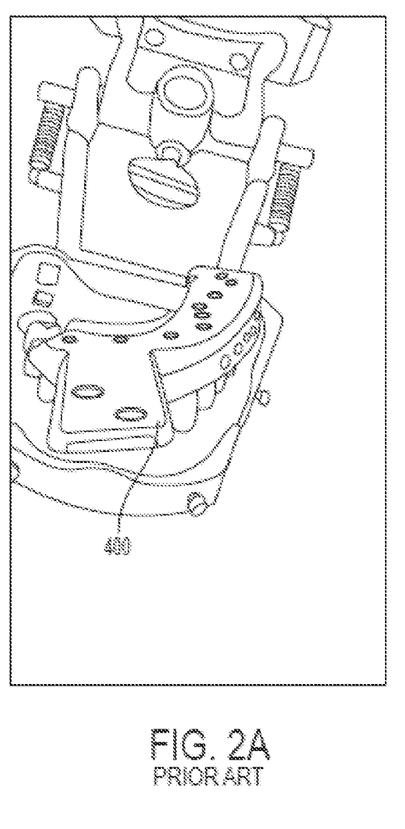
FIGS. 2A and 2B schematically illustrates a prior art splint device engaged with a representative model of a mouth of a patient so as to provide a fiducial marker and/or a tracking marker for a guidance system for a surgical robot for dental surgeries (FIG. 2A) and the prior art splint device disengaged from the representative model of the mouth of the patient (FIG. 2B)
Figure 2B:
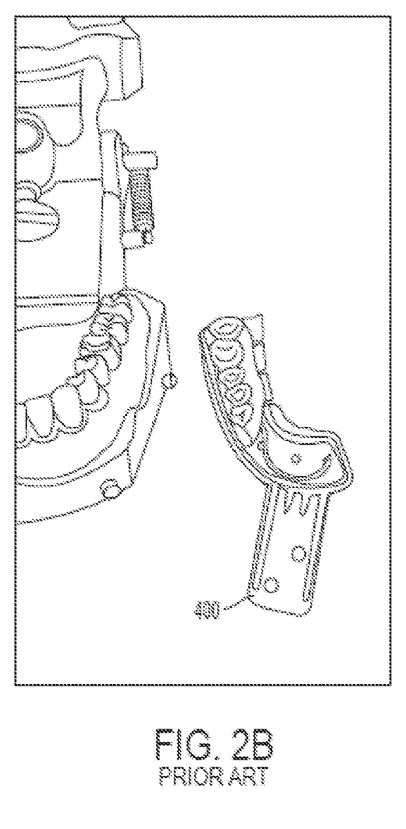

Prior art splint devices as shown, for example, in FIGS. 1, 2A, and 2B, also require a careful balance of the adhesive material (i.e., dental acrylic) to be applied in order to be effective in rigidly mounting the retainer portion to the teeth of the patient. For instance, if too little of the adhesive material is applied in the retainer portion, the splint device may be too easily separated from the teeth, since the amount of the adhesive material may not be sufficient to bond the retainer portion to the teeth to sufficiently resist the forces applied thereto during the surgical procedure. However, if too much of the adhesive material is applied to the retainer portion, the excess adhesive material may flow into the tooth undercuts (i.e., the portion of the tooth where the tooth narrows toward the gum-line and/or the spaces between teeth), the retainer portion will not be readily removable at the end of the surgical procedure, without, for instance, drilling into the solidified adhesive material to remove the retainer portion from the tooth/teeth. In such instances, the retainer portion will likely not be re-usable for the particular patient, and if further procedures are required, a new retainer portion, including a new mounting portion for the fiducial marker and/or tracking marker, may also be required.

As such, there exists a need for a splint device for forming a fiducial marker for the guidance system of a surgical robot used, for example, in dental surgery which addresses these and other limitations of prior art devices.

SUMMARY OF THE DISCLOSURE

The above and other needs are met by aspects of the present disclosure which, in one particular aspect, provides a splint device for guided robotic surgery. Such a device comprising an elongate first splint portion having first and second longitudinal ends, and a first interface edge extending therebetween. An elongate second splint portion has first and second longitudinal ends, and a second interface edge extending therebetween. The second splint portion co-extends with the first splint portion, with the second interface edge arranged as a complement to the first interface edge. An alignment provision includes a first alignment element engaged with the first splint portion and a second alignment element engaged with the second splint portion, the first and second alignment elements being arranged to interact with each other such that a substantially consistent gap is defined between the first and second interface edges, from the respective first ends to the respective second ends of the first and second splint portions, as the first and second splint portions are advanced toward each other. A threaded member is engaged between the first and second splint portions and is arranged to advance the first and second interface edges toward each other in response to advancement of the threaded member relative to the first and second splint portions. A tracking portion is engaged with the first splint portion or the second splint portion, and extends outwardly therefrom, wherein the tracking portion has a kinematic mount engaged therewith.

Another aspect of the present disclosure provides a method of applying a splint device for facilitating guided robotic surgery. Such a method comprises engaging an elongate first splint portion with a co-extending elongate second splint portion, wherein each splint portion has first and second longitudinal ends and an interface edge extending between the first and second ends, wherein the interface edges are arranged as a complement to each other, such that a first alignment element engaged with the first splint portion and a second alignment element engaged with the second splint portion interact with each other, wherein the first or second splint portion has a tracking portion engaged therewith and extending outwardly therefrom, and wherein the tracking portion has a kinematic mount engaged therewith. A threaded member is engaged between the first and second splint portions, with the threaded member being arranged to advance the first and second interface edges toward each other, as guided by the interacting first and second alignment elements, in response to advancement of the threaded member relative to the first and second splint portions such that a substantially consistent gap is defined between the first and second interface edges, from the respective first ends to the respective second ends of the first and second splint portions, as the first and second splint portions are advanced toward each other.

The present disclosure thus includes, without limitation, the following example embodiments:

Example Embodiment 1: A splint device for guided robotic surgery, said device comprising an elongate first splint portion having first and second longitudinal ends, and a first interface edge extending therebetween; an elongate second splint portion having first and second longitudinal ends, and a second interface edge extending therebetween, the second splint portion co-extending with the first splint portion with the second interface edge arranged as a complement to the first interface edge; an alignment provision including a first alignment element engaged with the first splint portion and a second alignment element engaged with the second splint portion, the first and second alignment elements being arranged to interact with each other such that a substantially consistent gap is defined between the first and second interface edges, from the respective first ends to the respective second ends of the first and second splint portions, as the first and second splint portions are advanced toward each other; a threaded member engaged between the first and second splint portions and arranged to advance the first and second interface edges toward each other in response to advancement of the threaded member relative to the first and second splint portions; and a tracking portion engaged with the first splint portion or the second splint portion and extending outwardly therefrom, the tracking portion having a kinematic mount engaged therewith.

Example Embodiment 2: The device of any preceding or subsequent example embodiment, or combinations thereof, wherein the first splint portion defines longitudinally spaced-apart relief holes.

Example Embodiment 3: The device of any preceding or subsequent example embodiment, or combinations thereof, wherein the second splint portion defines longitudinally spaced-apart relief holes.

Example Embodiment 4: The device of any preceding or subsequent example embodiment, or combinations thereof, wherein the kinematic mount is integrally formed with the tracking portion.

Example Embodiment 5: The device of any preceding or subsequent example embodiment, or combinations thereof, wherein the tracking portion extends from the first or second end of the first or second splint portion.

Example Embodiment 6: The device of any preceding or subsequent example embodiment, or combinations thereof, wherein the first alignment element is a frustoconical receptacle defined by the first splint portion, the frustoconical receptacle having a major diameter and a minor diameter, with the major diameter of the frustoconical receptacle being directed toward the second splint portion, and wherein the second alignment element is a frustoconical protrusion extending from the second splint portion, the frustoconical protrusion having a major diameter and a minor diameter, with the minor diameter of the frustoconical protrusion being directed toward the first splint portion.

Example Embodiment 7: The device of any preceding or subsequent example embodiment, or combinations thereof, wherein the alignment provision includes a first alignment provision and a second alignment provision, and wherein the threaded member, engaged between the first and second splint portions, is disposed between the first and second alignment provisions.

Example Embodiment 8: The device of any preceding or subsequent example embodiment, or combinations thereof, comprising a separability provision extending across the first and second splint portions, between the first or second alignment provision and the first or second longitudinal ends of the first and second splint portions, wherein the separability provision is arranged to be severable so as to facilitate adjustability of a length of the first and second splint portions.

Example Embodiment 9: The device of any preceding or subsequent example embodiment, or combinations thereof, wherein the separability provision comprises a reduced section thickness of the first and second splint portions.

Example Embodiment 10: The device of any preceding or subsequent example embodiment, or combinations thereof, comprising a fiducial marker element received by a depression defined by an outer surface of the first splint portion, the second splint portion, or the tracking portion, the fiducial marker element being received in a predetermined disposition relative to the kinematic mount.

Example Embodiment 11: The device of any preceding or subsequent example embodiment, or combinations thereof, wherein the fiducial marker element is spherical and the depression is hemispherical or an elongate concave channel arranged to receive the spherical fiducial marker element.

Example Embodiment 12: The device of any preceding or subsequent example embodiment, or combinations thereof, comprising a tool calibration provision engaged with the first splint portion, the second splint portion, or the tracking portion, the tool calibration provision being disposed in a predetermined disposition relative to the kinematic mount.

Example Embodiment 13: A method of applying a splint device for facilitating guided robotic surgery, said method comprising engaging an elongate first splint portion with a co-extending elongate second splint portion, each splint portion having first and second longitudinal ends and an interface edge extending between the first and second ends, and the interface edges being arranged as a complement to each other, such that a first alignment element engaged with the first splint portion and a second alignment element engaged with the second splint portion interact with each other, the first or second splint portion having a tracking portion engaged therewith and extending outwardly therefrom, and the tracking portion having a kinematic mount engaged therewith; and engaging a threaded member between the first and second splint portions, the threaded member being arranged to advance the first and second interface edges toward each other, as guided by the interacting first and second alignment elements, in response to advancement of the threaded member relative to the first and second splint portions such that a substantially consistent gap is defined between the first and second interface edges, from the respective first ends to the respective second ends of the first and second splint portions, as the first and second splint portions are advanced toward each other.

Example Embodiment 14: The method of any preceding or subsequent example embodiment, or combinations thereof, wherein engaging the first and second splint portion comprises engaging the first and second splint portions to form an elongate channel having a cross-section defining a concavity, and wherein the method further comprises applying an impression material within the concavity along the elongate channel.

Example Embodiment 15: The method of any preceding or subsequent example embodiment, or combinations thereof, wherein the first and second splint portions each define longitudinally spaced-apart relief holes, wherein the concavity of the elongate channel is arranged to receive an object therein, and wherein engaging a threaded member between the first and second splint portions comprises advancing the threaded member between the first and second splint portions so as to advance the first and second splint portions toward each other about the object, until excess impression material is relieved through the relief holes, to secure the first and second splint portions to the object via the impression material therebetween.

Example Embodiment 16: The method of any preceding or subsequent example embodiment, or combinations thereof, comprising depositing additional impression material in the gap between the first and second interface edges as the first and second splint portions are advanced toward each other.

Example Embodiment 17: The method of any preceding or subsequent example embodiment, or combinations thereof, comprising forming the kinematic mount integrally with the tracking portion.

Example Embodiment 18: The method of any preceding or subsequent example embodiment, or combinations thereof, comprising engaging the tracking portion with the first or second end of the first or second splint portion such that the tracking portion extends therefrom.

Example Embodiment 19: The method of any preceding or subsequent example embodiment, or combinations thereof, comprising forming the first alignment element as a frustoconical receptacle defined by the first splint portion, the frustoconical receptacle having a major diameter and a minor diameter, with the major diameter of the frustoconical receptacle being directed toward the second splint portion, and forming the second alignment element as a frustoconical protrusion extending from the second splint portion, the frustoconical protrusion having a major diameter and a minor diameter, with the minor diameter of the frustoconical protrusion being directed toward the first splint portion.

Example Embodiment 20: The method of any preceding or subsequent example embodiment, or combinations thereof, wherein the first and second alignment elements define an alignment provision, wherein the splint device includes a first alignment provision and a second alignment provision, and wherein engaging the threaded member between the first and second splint portions comprises engaging the threaded member between the first and second splint portion such that the threaded member is disposed between the first and second alignment provisions.

Example Embodiment 21: The method of any preceding or subsequent example embodiment, or combinations thereof, comprising forming a separability provision extending across the first and second splint portions, between the first or second alignment provision and the first or second longitudinal ends of the first and second splint portions, the separability provision is arranged to be severable so as to facilitate adjustability of a length of the first and second splint portions.

Example Embodiment 22: The method of any preceding or subsequent example embodiment, or combinations thereof, wherein forming the separability provision comprises forming the separability provision as a reduced section thickness of the first and second splint portions.

Example Embodiment 23: The method of any preceding or subsequent example embodiment, or combinations thereof, comprising engaging a fiducial marker element with a depression defined by an outer surface of the first splint portion, the second splint portion, or the tracking portion, in a predetermined disposition relative to the kinematic mount.

Example Embodiment 24: The method of any preceding or subsequent example embodiment, or combinations thereof, wherein engaging the fiducial marker element with the depression comprises engaging a spherical fiducial marker element with a hemispherical depression or an elongate concave channel depression arranged to receive the spherical fiducial marker element.

Example Embodiment 25: The method of any preceding or subsequent example embodiment, or combinations thereof, comprising engaging a tool calibration provision with the first splint portion, the second splint portion, or the tracking portion, in a predetermined disposition relative to the kinematic mount.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will be appreciated that the summary herein is provided merely for purposes of summarizing some example aspects so as to provide a basic understanding of the disclosure. As such, it will be appreciated that the above described example aspects are merely examples and should not be construed to narrow the scope or spirit of the disclosure in any way. It will be appreciated that the scope of the disclosure encompasses many potential aspects, some of which will be further described below, in addition to those herein summarized. Further, other aspects and advantages of such aspects disclosed herein will become apparent from the following detailed description taken in conjunction with the accompanying drawings which illustrate, by way of example, the principles of the described aspects.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

Figure 3A:
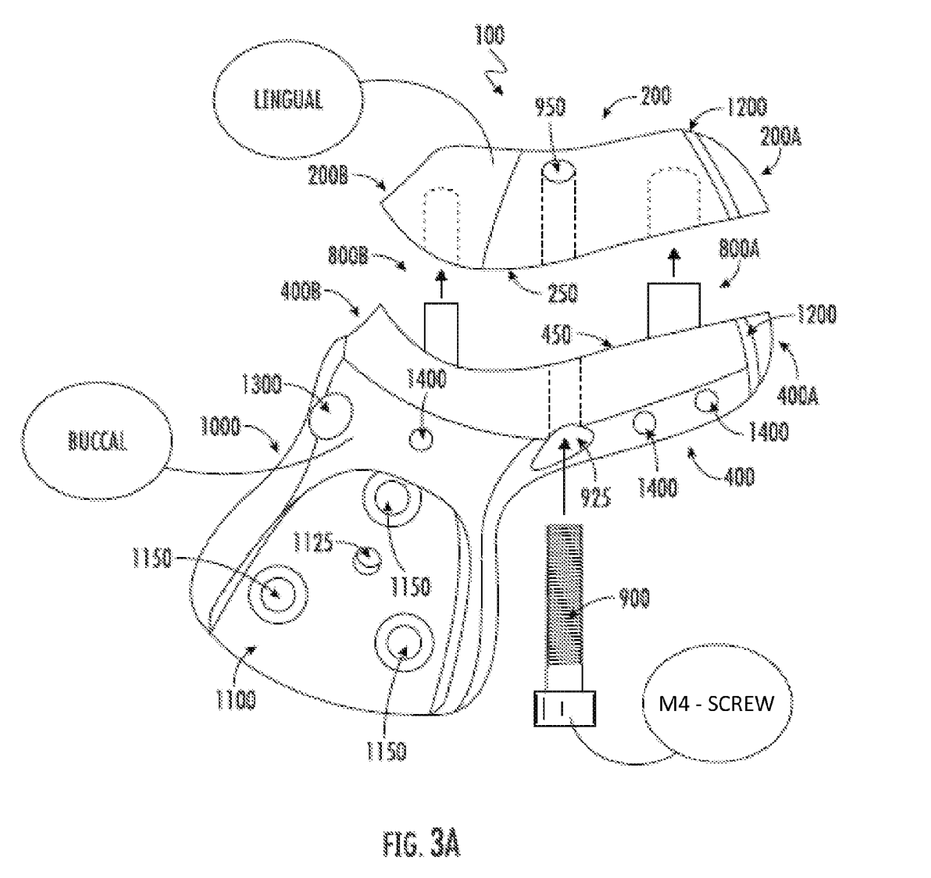
FIG. 3A schematically illustrates a perspective view of a splint device arranged to provide a fiducial marker and/or a tracking marker for a guidance system for a surgical robot, according to one aspect of the present disclosure.

Particular aspects of the present disclosure as shown, for example, in FIG. 3A, provide a splint device 100 for use with a guidance system of a surgical robot, for instance, in dental surgery. One skilled in the art, however, will appreciate that the concept of the splint device disclosed herein as forming a fiducial marker and/or a tracking marker, or otherwise a frame of reference for a surgical robotic system may find applicability to other surgical processes not involving dental surgery, such as, for example, orthopedic surgery, ENT surgery, and neurosurgery. As such, the aspects of the disclosure presented herein are merely examples of the applicability of the disclosed concepts and are not intended to be limiting in any manner.

Figure 6:
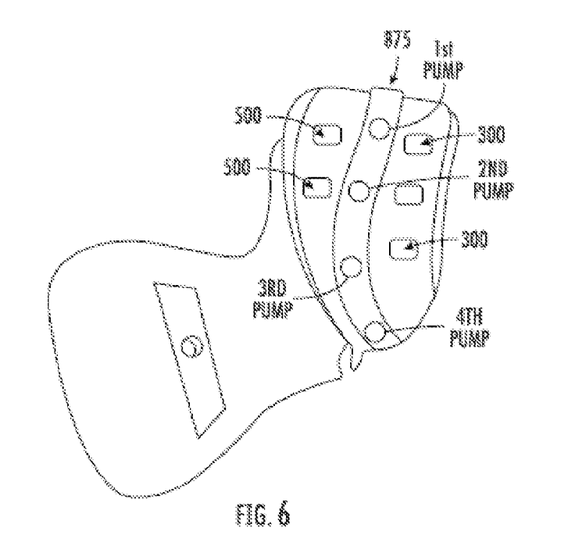
Figure 7:
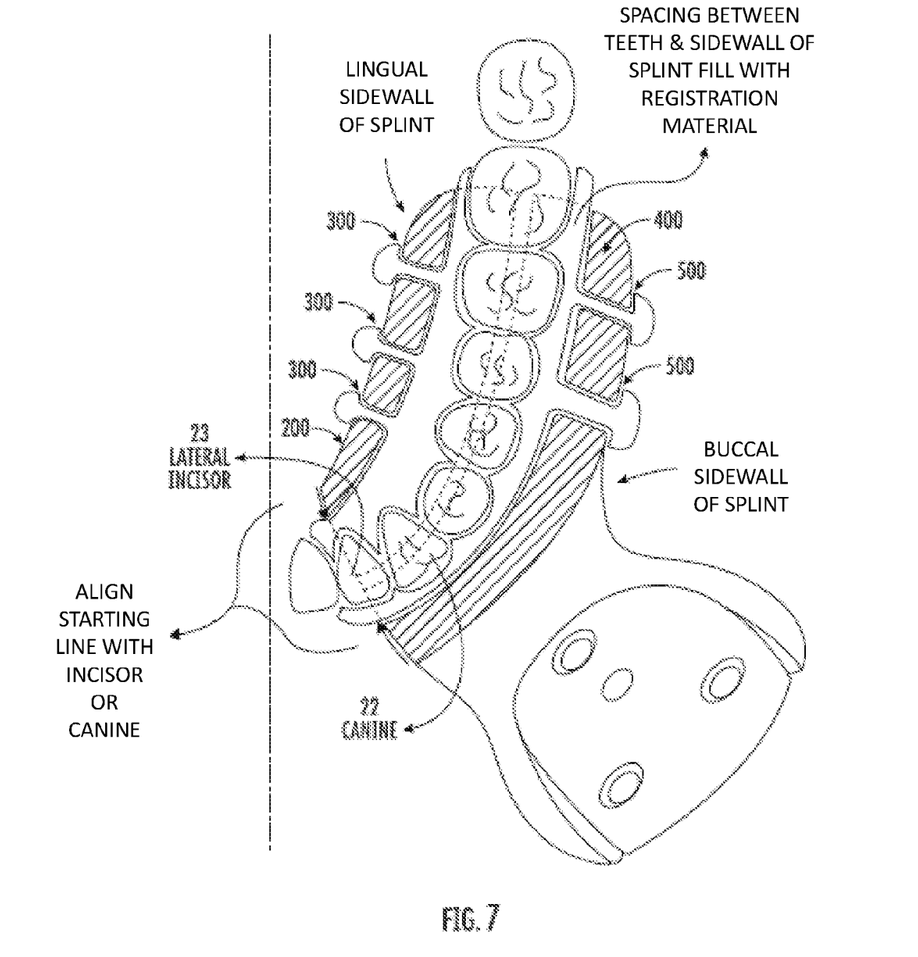

Such a splint device 100 implemented in conjunction with a guided surgical robot may comprise, for example, an elongate first splint portion 200 (e.g., a lingual portion) having first and second longitudinal ends 200A, 200B, having a first interface edge 250 extending between the first and second ends 200A, 200B, and in some instances defining longitudinally spaced-apart relief holes 300 (see, e.g., FIGS. 6 and 7). An elongate second splint portion 400 (e.g., a buccal portion) has first and second longitudinal ends 400A, 400B, has a second interface edge 450 extending between the first and second edges 400A, 400B, and in some instances defines longitudinally spaced-apart relief holes 500 (see, e.g., FIGS. 6 and 7). The second splint portion 400 generally co-extends with the first splint portion 200, wherein the second interface edge 450 is arranged as a complement to the first interface edge 250, as shown, for example, in FIGS. 3A and 3B.

Figure 3B:
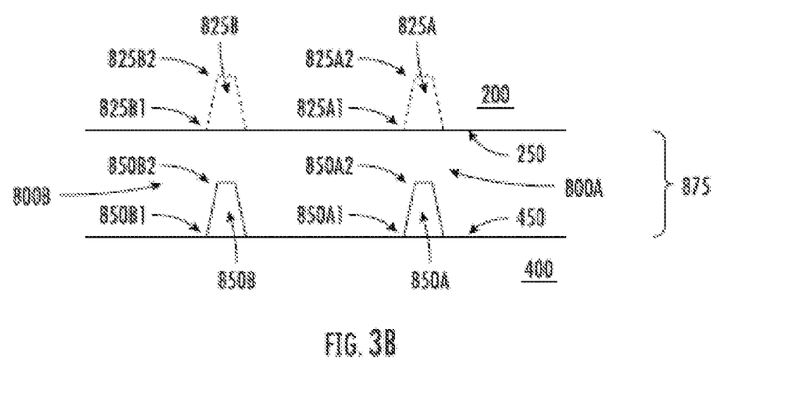
FIG. 3B schematically illustrates a plan view of an alignment provision for two portions of a splint device arranged to provide a fiducial marker and/or a tracking marker for a guidance system for a surgical robot, according to one aspect of the present disclosure.

In some aspects, as shown, for example, in FIGS. 3A and 3B, the splint device 100 includes at least one alignment provision 800A or 800B, wherein each alignment provision includes a first alignment element 825A or 825B engaged with the first splint portion 200 and a second alignment element 850A or 850B engaged with the second splint portion 400. In particular aspects, the splint device 100 includes at least two alignment provisions 800A, 800B, wherein one of the alignment provisions 800A includes a first alignment element 825A engaged with the first splint portion 200 and a second alignment element 850A engaged with the second splint portion 400, and the other of the alignment provisions 800B includes a first alignment element 825B engaged with the first splint portion 200 and a second alignment element 850B engaged with the second splint portion 400.

In some aspects, the corresponding first and second alignment elements 825A, 850A and/or 825B, 850B are configured as complements to each other. For example, as shown in FIG. 3B, the first alignment element 825A and/or 825B can be a frustoconical receptacle defined by the first splint portion 200, wherein the frustoconical receptacle has a major diameter 825A1 and/or 825B1 and a minor diameter 825A2 and/or 825B2, with the major diameter 825A1 and/or 825B1 of the frustoconical receptacle being directed toward the second splint portion 400. Accordingly, the second alignment element 850A and/or 850B is a frustoconical protrusion extending from the second splint portion 400, wherein the frustoconical protrusion has a major diameter 850A1 and/or 850B1 and a minor diameter 850A2 and/or 850B2, with the minor diameter 850A2 and/or 850B2 of the frustoconical protrusion being directed toward the first splint portion 200. One skilled in the art will appreciate, however, that the alignment provision(s) may be configured and arranged in many different manners instead of or in addition to the configurations/arrangements disclosed herein, and that the examples disclosed herein are not limiting in this regard in any manner.

Generally, the first alignment element 825A and/or 825B and second alignment element 850A and/or 850B are arranged to interact with each other (e.g., the alignment protrusion being received by the alignment receptacle) such that a substantially consistent gap 875 (see, e.g., FIG. 3B) is defined between the first and second interface edges 250, 450, from the respective first ends 200A, 400A to the respective second ends 200B, 400B of the first and second splint portions 200, 400, as the first and second splint portions 200, 400 are advanced toward each other.

In some aspects, a threaded member 900 is engaged between the first and second splint portions 200, 400 and is arranged to advance the first and second interface edges 250, 450 toward each other in response to advancement of the threaded member 900 relative to the first and second splint portions 200, 400. For example, the second splint portion 400 defines an unthreaded bore 925 arranged to allow the threaded member 900 to pass therethrough, while the first splint portion 200 defines a threaded bore 950 arranged opposite the unthreaded bore 925 and configured to form a threaded engagement with the threaded member 900. Accordingly, advancing the threaded member 900 through the unthreaded bore 925 and into engagement with the threaded bore 950, while the alignment provisions 800A, 800B are engaged, forms a mechanism for advancing/retracting the first and second splint portions 200, 400 with respect to each other upon advancement or retraction of the threaded member 900 with respect to the threaded bore 950, while maintaining the substantially consistent gap 875 between the first and second interface edges 250, 450. As shown, for example, in FIG. 3A, in instances where the splint device 100 includes a first and a second alignment provision 800A, 800B, the threaded member 900 engaged between the first and second splint portions 200, 400, is disposed between the first and second alignment provisions 800A, 800B.

In some aspects, a tracking portion 1000 is engaged with the first splint portion 200 or the second splint portion 400, and extends outwardly therefrom. In FIG. 3A, the tracking portion 1000 is engaged with the second (buccal) splint portion 400. More particularly, in some aspects, the tracking portion 1000 extends from the first end 200A, 400A or the second end 200B, 400B of the first or second splint portion 200, 400. In some instances, the tracking portion 1000 has a kinematic mount 1100 engaged therewith. In some aspects, the kinematic mount 1100 is integrally formed with the tracking portion 1000.

The kinematic mount 1100 (see, e.g., FIG. 3A), in some instances, defines a central locating receptacle 1125 surrounded by three or more angularly spaced-apart protrusions 1150. Such a kinematic mount 1100 is generally configured to receive a complementarily-configured mount (not shown) including or engaged with a tracking provision. The tracking provision can include, for example, a physically connected tracking provision such as a tracking arm connected to the surgical robot. In other instances, the tracking provision can include, for example, a non-physically connected tracking provision such as an optical tracking device, a magnetic tracking device, a wireless or WiFi tracking device, an electromagnetic tracking device, an inductive tracking device, or any other form of tracking device that does not require a physical connection between the tracking provision affixed to the kinematic mount 1100 and the surgical robot. In either instance, the integration of the kinematic mount 1100 into the tracking portion 1000 provides for repeatable engagement with the tracking provision, with interchangeable engagement between different types of tracking provisions. The integration of the kinematic mount 1100 can further be accomplished, for example, through molding, machining, and or 3D printing.

In other instances, a separability provision 1200 (see, e.g., FIG. 3A) extends across the first and second splint portions 200, 400, between the first or second alignment provision 800A, 800B and the first longitudinal ends 200A, 400A or second longitudinal ends 200B, 400B of the first and second splint portions 200, 400, wherein the separability provision 1200 is arranged to be severable so as to facilitate adjustability of a length of the first and second splint portions 200, 400. The adjustability of the length of the splint device 100 via the separability provision 1200 can facilitate, for example, the implementation of the splint device 100 to a variety of different size applications (e.g., adult teeth or children's teeth). The separability provision 1200, in some aspects, comprises a reduced section thickness extending across the first and second splint portions 200, 400. In other aspects, multiple severability provisions 1200 can be provided along the first and second splint portions 200, 400 to provide for multiple adjustability of the length of the splint device 100.

In other instances, a tool calibration provision 1300 (see, e.g., FIG. 3A) is engaged with the first splint portion 200, the second splint portion 400, or the tracking portion 1000, wherein the tool calibration provision 1300 is disposed in a predetermined disposition relative to the kinematic mount 1100. The tool calibration provision 1300 may be configured, for example, as a receptacle or other suitable surface feature for receiving the end effector (e.g., a tip of a drill bit) of a surgical instrument affixed to the surgical robot. The tool calibration provision 1300, in some instances, is formed integrally with the particular component of the splint device 100 or, in other instances, can be a separate and discrete element (e.g., a durable element such as a metal element, a ceramic element, or other suitable element). Since the tool calibration provision 1300 is in a known disposition relative to the kinematic mount 1100, the tool calibration provision 1300, upon interaction with the end effector of the surgical robot, provides a confirmation or calibration that the end effector is accurately tracked in relation to the surgical robot for conducting a procedure. In some instances, the tool calibration provision 1300 is radiopaque such that the disposition thereof with respect to the kinematic mount 1100 can be determined and/or confirmed through imaging analysis.

In yet other instances, a fiducial marker element 1400 (see, e.g., FIG. 3A) is received by a depression (not shown) defined by an outer surface (e.g., the outer surface of the second splint portion 400) of the splint device 100 or the tracking portion 600, wherein the fiducial marker element 1400 is received in a predetermined disposition relative to the kinematic mount 1100. In particular aspects, the outer surface of the splint device 100 defines a plurality of depressions arranged to receive a corresponding plurality of fiducial marker elements 1400. For example, in some aspects, the fiducial marker element 1400 is spherical and the depression is hemispherical or an elongate concave channel arranged to receive the spherical fiducial marker element 1400. Once secured with the respective depression, whether through an interference fit (e.g., a press fit), by overmolding, or with an adhesive material (e.g., epoxy) disposed with the depression, the fiducial marker element(s) 1400 are essentially embedded within the splint device 100. Moreover, in some aspects, the depressions are oriented such that the adhesive material (e.g., epoxy) is retained, such as by gravity, at the location in the depression at which the fiducial marker element 1400 is secured/embedded. Since the fiducial marker element(s) 1400 are radiopaque in some aspects, the fiducial marker element(s) 1400 can be detected through imaging analysis (e.g., a CT scan). Accordingly, in particular instances, the fiducial marker element(s) 1400 are radiopaque and can be differentiated from the splint device 100 (e.g., formed of a plastic/polymeric material). Since the fiducial marker element(s) 1400 are all embedded with the splint device 100, the field of view of the imaging analysis (e.g., the CT scan) can be reduced.

Figure 4:
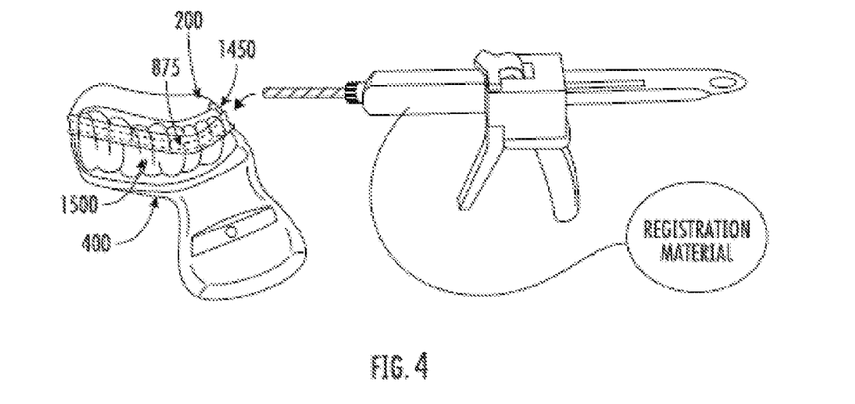
FIGS. 4-10 schematically and collectively illustrate a method of implementing a splint device for a guidance system for a surgical robot, with the splint device configured to facilitate removability, according to one aspect of the present disclosure.

In some aspects, the first and second splint portions 200, 400 interact to collectively form an elongate channel 1450 (see, e.g., FIG. 4) having an inner surface defining a concavity (e.g., a "U" channel in cross-section). In such instances, the elongate channel 1450 is arranged and configured, for example, to receive a bite registration material or a dental impression material 1500 therein, where such a material can comprise, for example, a vinyl polysiloxane material. One skilled in the art will appreciate, however, that such an example material is not limiting in any manner and that many other materials can be suitable for conforming to, for example, a patient's tooth structure without adhering to the tooth surface itself. Accordingly, once the impression material 1500 is deposited within the elongate channel 1450 defined by the splint device 100 as shown, for example, in FIG. 4, the splint device 100 is then applied to an object such as, for example, the teeth or jaw of a patient undergoing a dental surgical procedure. One skilled in the art will appreciate, however, that the application of the splint device 100 and the subsequent procedure does not necessarily involve a human patient. For example, the splint could be applied to a dummy patient for facilitating training of a user, for demonstration purposes, or otherwise for verification of the apparatus/system itself.

Figure 5:
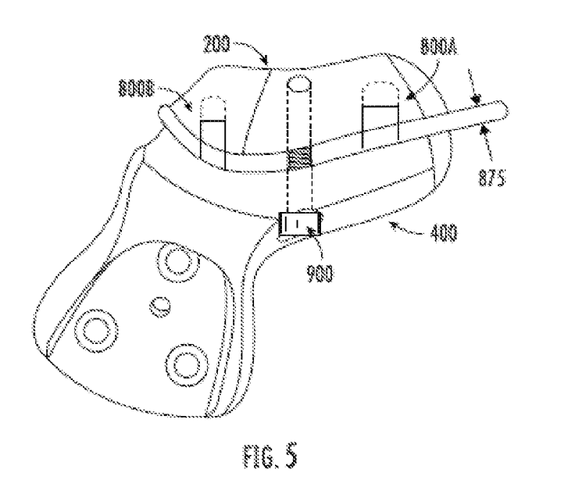

As previously disclosed, once the splint device 100 is applied to the object, the threaded member 900 can be advanced in the threaded engagement with the threaded bore 950 defined by the first splint portion 200 so as to advance the first splint portion 200 toward the second splint portion 400 and secure the subject therebetween, while maintaining the substantially consistent gap 875 between the first and second interface edges 250, 450 as shown, for example, in FIG. 5. As shown in FIG. 6, in some instances, addition impression material 1500 may be applied in the gap 875 between the first and second interface edges 250, 450 as the first and second splint portions are advanced toward each other by way of advancement of the threaded member 900.

Figure 8:
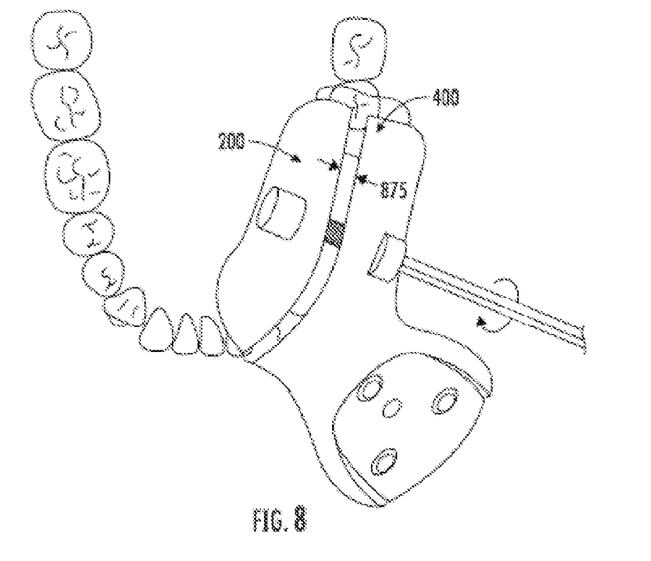
Figure 9:
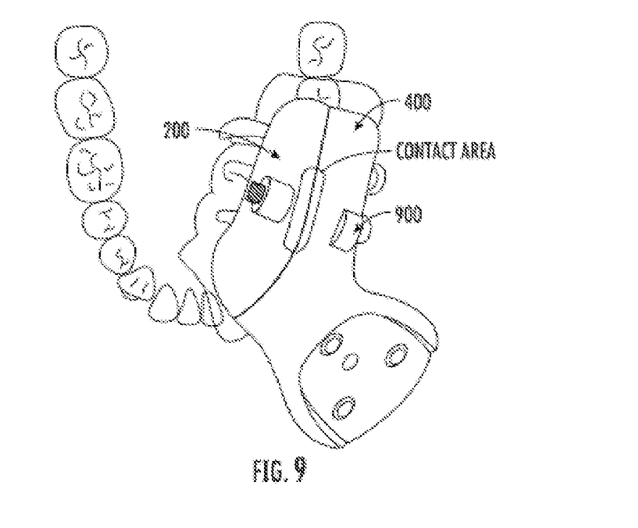
Figure 10:
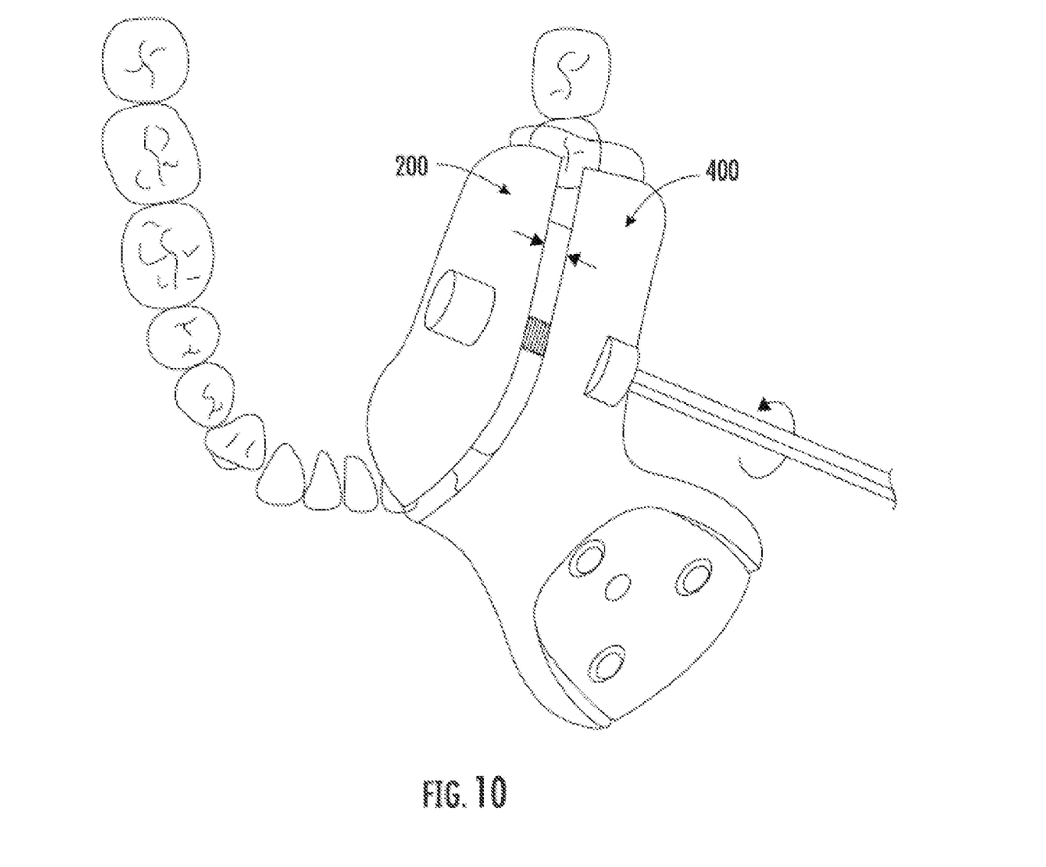

As the first and second splint portion 200, 400 are advanced toward the object (see, e.g., FIG. 8), any excess impression material 1500 within the elongate channel 1450 is relieved by flow of the impression material out of the elongate channel through the respective relief holes 300, 500 toward the outer surface of the first and/or second splint portions 200, 400 (see, e.g., FIGS. 6 and 7). In this manner, the splint device 100 is secured to the object, such as the teeth/jaw of a patient. When the impression material 1500 sets, the splint device 100 thus becomes securely fastened to the object (e.g., teeth or jaw of a patient), without the impression material significantly adhering to the surface of the teeth/jaws as compared to an adhesive material such as acrylic. The set/cured impression material 1500 is sufficiently rigid so as to provide a secure and rigid mount of the splint device 100 to the teeth/jaw of the patient in conjunction with the pressure applied thereto by the first and second splint portions 200, 400 urged toward each other by the threaded member 900. In some instances, as shown for example in FIG. 9, the first and second splint portions 200, 400 can be advanced toward each other by the threaded member 900 until the first and second interface edges 250, 450 contact each other to sufficiently secure the splint device 100 to the teeth/jaw of the patient. As shown, for example, in FIG. 10, removal of the splint device 100 thus becomes a matter of retracting the threaded member 900 from the threaded bore 950 of the first splint portion 200, which releases the pressure on the impression material 1500 exerted by the first and second splint portions 200, 400 and allows the splint device 100 to be removed from the object (since the impression material would also not adhere to the splint device 100).

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "I" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

That which is claimed:

1. A splint device for guided robotic surgery, said device comprising:

an elongate first splint portion having first and second longitudinal ends, and a first interface edge extending therebetween;

an elongate second splint portion having first and second longitudinal ends, and a second interface edge extending therebetween, the second splint portion co-extending with the first splint portion with the second interface edge arranged as a complement to the first interface edge;

an alignment provision including a first alignment element engaged with the first splint portion and a second alignment element engaged with the second splint portion, the first and second alignment elements being arranged to interact with each other such that a gap is defined between the first interface edge and the second interface edge, from the respective first ends to the respective second ends of the first and second splint portions, as the first and second splint portions are advanced toward each other;

a threaded member engaged between the first and second splint portions and arranged to advance the first and second interface edges toward each other in response to advancement of the threaded member relative to the first and second splint portions; and a tracking portion engaged with the first splint portion or the second splint portion and extending outwardly therefrom, the tracking portion having a kinematic mount engaged therewith.

2. The device of claim 1, wherein the first splint portion includes a first plurality of longitudinally spaced-apart relief holes.

3. The device of claim 1, wherein the second splint portion includes a second plurality of longitudinally spaced-apart relief holes.

4. The device of claim 1, wherein the kinematic mount is integrally formed with the tracking portion.

5. The device of claim 1, wherein the tracking portion extends from the first or second end of the first or second splint portion.

6. The device of claim 1, wherein the first alignment element is a frustoconical receptacle defined by the first splint portion, the frustoconical receptacle having a major diameter and a minor diameter, with the major diameter of the frustoconical receptacle being directed toward the second splint portion, and wherein the second alignment element is a frustoconical protrusion extending from the second splint portion, the frustoconical protrusion having a major diameter and a minor diameter, with the minor diameter of the frustoconical protrusion being directed toward the first splint portion.

7. The device of claim 1, comprising a tool calibration provision engaged with the first splint portion, the second splint portion, or the tracking portion, the tool calibration provision being disposed in a predetermined disposition relative to the kinematic mount.

8. The device of claim 1, wherein the alignment provision includes a first alignment provision and a second alignment provision, and wherein the threaded member, engaged between the first and second splint portions, is disposed between the first and second alignment provisions.

9. The device of claim 8, comprising a separability provision extending across the first and second splint portions, between the first or second alignment provision and the first or second longitudinal ends of the first and second splint portions, wherein the separability provision is arranged to be severable so as to facilitate adjustability of a length of the first and second splint portions.

10. The device of claim 9, wherein the separability provision comprises a reduced section thickness of the first and second splint portions.

11. The device of claim 1, comprising a fiducial marker element received by a depression defined by an outer surface of the first splint portion, the second splint portion, or the tracking portion, the fiducial marker element being received in a predetermined disposition relative to the kinematic mount.

12. The device of claim 11, wherein the fiducial marker element is spherical and the depression is hemispherical or an elongate concave channel arranged to receive the spherical fiducial marker element.

13. A method of applying a splint device for facilitating guided robotic surgery, said method comprising:

engaging an elongate first splint portion with a co-extending elongate second splint portion, each splint portion having first and second longitudinal ends and an interface edge extending between the first and second ends, and the interface edges being arranged as a complement to each other, such that a first alignment element engaged with the first splint portion and a second alignment element engaged with the second splint portion interact with each other, the first or second splint portion having a tracking portion engaged therewith and extending outwardly therefrom, and the tracking portion having a kinematic mount engaged therewith; and engaging a threaded member between the first and second splint portions, the threaded member being arranged to advance the first and second interface edges toward each other, as guided by the interacting first and second alignment elements, in response to advancement of the threaded member relative to the first and second splint portions such that a gap is defined between the first interface edge and the second interface edge, from the respective first ends to the respective second ends of the first and second splint portions, as the first and second splint portions are advanced toward each other.

14. The method of claim 13, comprising forming the kinematic mount integrally with the tracking portion.

15. The method of claim 13, comprising engaging the tracking portion with the first or second end of the first or second splint portion such that the tracking portion extends therefrom.

16. The method of claim 13, comprising forming the first alignment element as a frustoconical receptacle defined by the first splint portion, the frustoconical receptacle having a major diameter and a minor diameter, with the major diameter of the frustoconical receptacle being directed toward the second splint portion, and forming the second alignment element as a frustoconical protrusion extending from the second splint portion, the frustoconical protrusion having a major diameter and a minor diameter, with the minor diameter of the frustoconical protrusion being directed toward the first splint portion.

17. The method of claim 13, comprising engaging a tool calibration provision with the first splint portion, the second splint portion, or the tracking portion, in a predetermined disposition relative to the kinematic mount.

18. The method of claim 13, wherein engaging the first and second splint portion comprises engaging the first and second splint portions to form an elongate channel having a cross-section defining a concavity, and wherein the method further comprises applying an impression material within the concavity along the elongate channel.

19. The method of claim 18, wherein the first and second splint portions each include a plurality of longitudinally spaced-apart relief holes, wherein the concavity of the elongate channel is arranged to receive an object therein, and wherein engaging the threaded member between the first and second splint portions comprises advancing the threaded member between the first and second splint portions so as to advance the first and second splint portions toward each other about the object, until excess impression material is relieved through the respective plurality of longitudinally spaced-apart relief holes, to secure the first and second splint portions to the object via the impression material therebetween.

20. The method of claim 19, comprising depositing additional impression material in the gap between the first and second interface edges as the first and second splint portions are advanced toward each other.

21. The method of claim 13, wherein the first and second alignment elements define an alignment provision, wherein the splint device includes a first alignment provision and a second alignment provision, and wherein engaging the threaded member between the first and second splint portions comprises engaging the threaded member between the first and second splint portion such that the threaded member is disposed between the first and second alignment provisions.

22. The method of claim 21, comprising forming a separability provision extending across the first and second splint portions, between the first or second alignment provision and the first or second longitudinal ends of the first and second splint portions, the separability provision is arranged to be severable so as to facilitate adjustability of a length of the first and second splint portions.

23. The method of claim 22, wherein forming the separability provision comprises forming the separability provision as a reduced section thickness of the first and second splint portions.

24. The method of claim 13, comprising engaging a fiducial marker element with a depression defined by an outer surface of the first splint portion, the second splint portion, or the tracking portion, in a predetermined disposition relative to the kinematic mount.

25. The method of claim 24, wherein engaging the fiducial marker element with the depression comprises engaging a spherical fiducial marker element with a hemispherical depression or an elongate concave channel depression arranged to receive the spherical fiducial marker element.

* * * * *